United States Patent [19]
Muth et al.

[11] Patent Number: 5,788,357
[45] Date of Patent: Aug. 4, 1998

[54] MIRROR ASSEMBLY

[75] Inventors: Michael D. Muth; Keith R. Spencer, both of Sheboygan, Wis.

[73] Assignee: K. W. Muth Company, Inc.

[21] Appl. No.: 704,084

[22] Filed: Aug. 28, 1996

[51] Int. Cl.$^6$ .................................................. B60Q 1/00
[52] U.S. Cl. .................... 362/83.1; 359/634; 359/839; 359/589
[58] Field of Search .................... 362/83.1, 30, 135, 362/61; 359/839, 613, 359, 589, 603, 634, 884, 584, 588

[56] References Cited

U.S. PATENT DOCUMENTS

| | | |
|---|---|---|
| 2,060,401 | 11/1936 | Smith . |
| 2,180,610 | 11/1939 | Ritz-Woller . |
| 2,190,123 | 2/1940 | Pace . |
| 2,263,382 | 11/1941 | Gotzinger . |
| 2,580,014 | 12/1951 | Gazda . |
| 2,595,331 | 5/1952 | Calihan et al. . |
| 3,040,207 | 6/1962 | Grontkowski ............................ 315/77 |
| 3,266,016 | 8/1966 | Maruyama et al. ...................... 340/98 |
| 3,436,758 | 4/1969 | Kluth ....................................... 340/376 |
| 3,449,626 | 6/1969 | De Coye De Castelet .............. 315/77 |
| 3,532,871 | 10/1970 | Shipman ................................. 240/7.1 |
| 3,543,018 | 11/1970 | Barcus et al. ........................... 240/4.2 |
| 3,665,392 | 5/1972 | Annas ...................................... 340/67 |
| 3,840,851 | 10/1974 | Fowler et al. ............................ 340/74 |
| 4,005,992 | 2/1977 | Kmetz et al. ............................ 350/160 |
| 4,023,029 | 5/1977 | Fischer ..................................... 240/4.2 |
| 4,040,726 | 8/1977 | Paca ......................................... 350/288 |
| 4,066,332 | 1/1978 | Kato et al. ............................... 350/126 |
| 4,158,483 | 6/1979 | Fischer et al. .......................... 350/289 |
| 4,274,078 | 6/1981 | Isobe et al. .............................. 340/98 |
| 4,299,444 | 11/1981 | Romer ...................................... 350/278 |
| 4,443,057 | 4/1984 | Bauer et al. ............................. 350/281 |
| 4,463,411 | 7/1984 | Proctor .................................... 362/61 |
| 4,475,100 | 10/1984 | Duh ......................................... 340/98 |
| 4,479,172 | 10/1984 | Connor .................................... 362/135 |
| 4,491,390 | 1/1985 | Tong-Shen .............................. 350/331 |
| 4,499,451 | 2/1985 | Suzuki et al. ........................... 340/98 |
| 4,506,315 | 3/1985 | Maekawa et al. ....................... 362/308 |
| 4,516,197 | 5/1985 | Yonkers ................................... 362/342 |
| 4,583,155 | 4/1986 | Hart ......................................... 362/285 |
| 4,588,267 | 5/1986 | Pastore .................................... 350/600 |
| 4,591,954 | 5/1986 | Kawamura et al. ..................... 362/61 |
| 4,603,946 | 8/1986 | Kato et al. ............................... 350/331 |
| 4,613,791 | 9/1986 | Kurihara et al. ........................ 315/82 |
| 4,623,222 | 11/1986 | Itoh et al. ................................ 350/331 |
| 4,626,967 | 12/1986 | Segoshi ................................... 362/61 |
| 4,630,904 | 12/1986 | Pastore .................................... 350/600 |
| 4,646,210 | 2/1987 | Skogler et al. .......................... 362/142 |
| 4,659,967 | 4/1987 | Dahl ........................................ 315/307 |
| 4,665,321 | 5/1987 | Chang et al. ............................ 307/10 |
| 4,701,022 | 10/1987 | Jacob ....................................... 350/278 |
| 4,721,364 | 1/1988 | Itoh et al. ................................ 350/332 |
| 4,733,335 | 3/1988 | Serizawa et al. ........................ 362/80 |
| 4,733,336 | 3/1988 | Skogler et al. .......................... 362/142 |
| 4,791,534 | 12/1988 | Lindberg ................................. 362/80 |
| 4,793,690 | 12/1988 | Gahan et al. ............................ 350/279 |
| 4,799,768 | 1/1989 | Gahan ..................................... 350/279 |
| 4,807,096 | 2/1989 | Skogler et al. .......................... 362/142 |
| 4,841,198 | 6/1989 | Wilhelm .................................. 315/82 |
| 4,862,330 | 8/1989 | Machida et al. ........................ 362/61 |
| 4,868,459 | 9/1989 | Dennerlein et al. .................... 315/158 |
| 4,868,719 | 9/1989 | Kouchi et al. ........................... 362/61 |
| 4,882,565 | 11/1989 | Gallmeyer ............................... 340/461 |

(List continued on next page.)

FOREIGN PATENT DOCUMENTS

| | | |
|---|---|---|
| 1141966 | 8/1971 | Australia . |
| 268359 | 7/1927 | United Kingdom . |
| 1172382 | 11/1969 | United Kingdom . |

Primary Examiner—Thomas M. Sember
Attorney, Agent, or Firm—Wells, St. John, Roberts, Gregory & Matkin,PS

[57] ABSTRACT

A mirror assembly including a semitransparent mirror which passes about 1% to about 8% of a broad band of visible light, and which reflects about 35% to about 58% of a broad band of visible light. A light assembly is positioned adjacent to the semitransparent mirror and emits visible light which is passed by the semitransparent mirror. The luminous intensity of the mirror assembly being about 2 to about 20 candelas.

57 Claims, 5 Drawing Sheets

U.S. PATENT DOCUMENTS

| | | | |
|---|---|---|---|
| 4,886,960 | 12/1989 | Molyneux et al. | 250/209 |
| 4,893,063 | 1/1990 | Pernyeszi | 315/307 |
| 4,916,430 | 4/1990 | Vu et al. | 340/463 |
| 4,917,477 | 4/1990 | Bechtel et al. | 350/357 |
| 4,929,866 | 5/1990 | Murata et al. | 313/500 |
| 4,935,665 | 6/1990 | Murata | 313/500 |
| 4,951,179 | 8/1990 | Machida | 362/61 |
| 5,014,167 | 5/1991 | Roberts | 362/83.1 |
| 5,029,060 | 7/1991 | Aho et al. | 362/299 |
| 5,050,051 | 9/1991 | Machida et al. | 362/80.1 |
| 5,059,015 | 10/1991 | Tran | 359/844 |
| 5,072,340 | 12/1991 | Jones | 362/80 |
| 5,093,768 | 3/1992 | Ohe | 362/241 |
| 5,097,395 | 3/1992 | Aho et al. | 362/32 |
| 5,150,966 | 9/1992 | Nelson | 362/337 |
| 5,165,772 | 11/1992 | Wu | 362/26 |
| 5,174,649 | 12/1992 | Alston | 362/244 |
| 5,189,537 | 2/1993 | O'Farrell | 362/83.1 |
| 5,207,492 | 5/1993 | Roberts | 362/30 |
| 5,211,466 | 5/1993 | Jarocki et al. | 362/83.3 |
| 5,241,457 | 8/1993 | Sasajima et al. | 362/80.1 |
| 5,272,602 | 12/1993 | Sasajima et al. | 362/80.1 |
| 5,285,060 | 2/1994 | Larson et al. | 250/214 |
| 5,303,130 | 4/1994 | Wei et al. | 362/83.1 |
| 5,355,284 | 10/1994 | Roberts | 362/30 |
| 5,361,190 | 11/1994 | Roberts et al. | 362/61 |
| 5,371,659 | 12/1994 | Pastrick et al. | 362/83.1 |
| 5,388,035 | 2/1995 | Bodem, Jr. | 362/61 |
| 5,402,103 | 3/1995 | Tashiro | 340/475 |
| 5,404,869 | 4/1995 | Parkyn, Jr. et al. | 126/699 |
| 5,436,741 | 7/1995 | Crandell | 362/83.1 |
| 5,436,809 | 7/1995 | Brassier et al. | 362/61 |
| 5,438,487 | 8/1995 | Schmid et al. | 362/61 |
| 5,481,409 | 1/1996 | Roberts | 359/839 |
| 5,497,305 | 3/1996 | Pastrick et al. | 362/83.1 |
| 5,497,306 | 3/1996 | Pastrick | 362/83.1 |
| 5,528,422 | 6/1996 | Roberts | 359/583 |

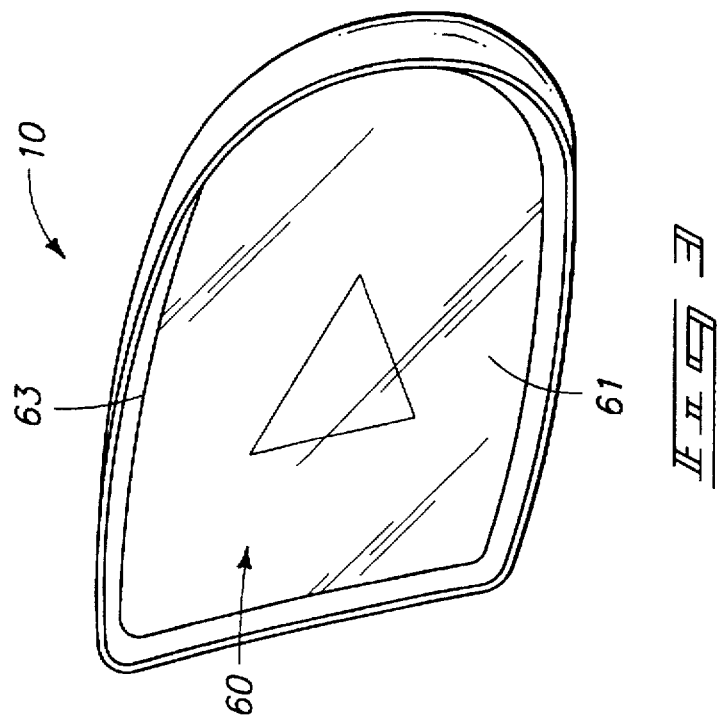
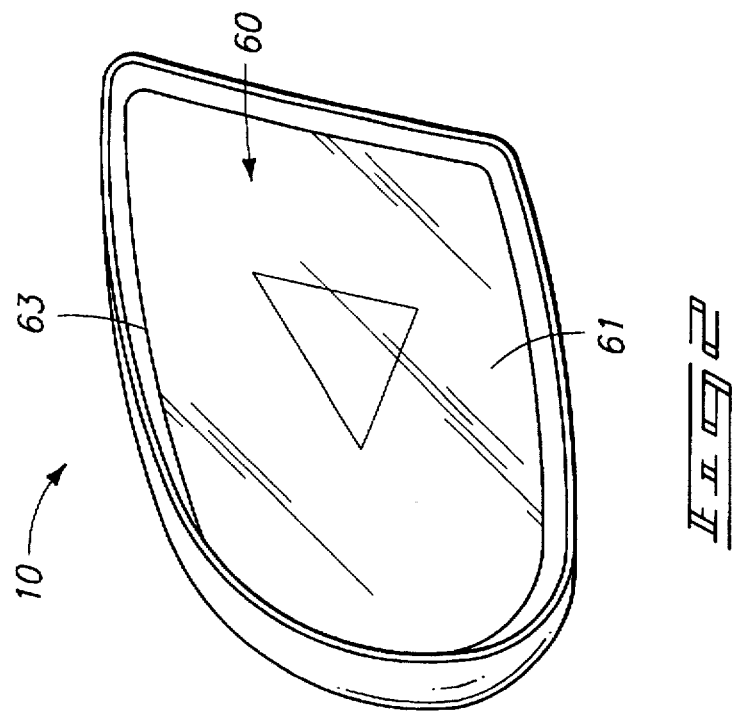

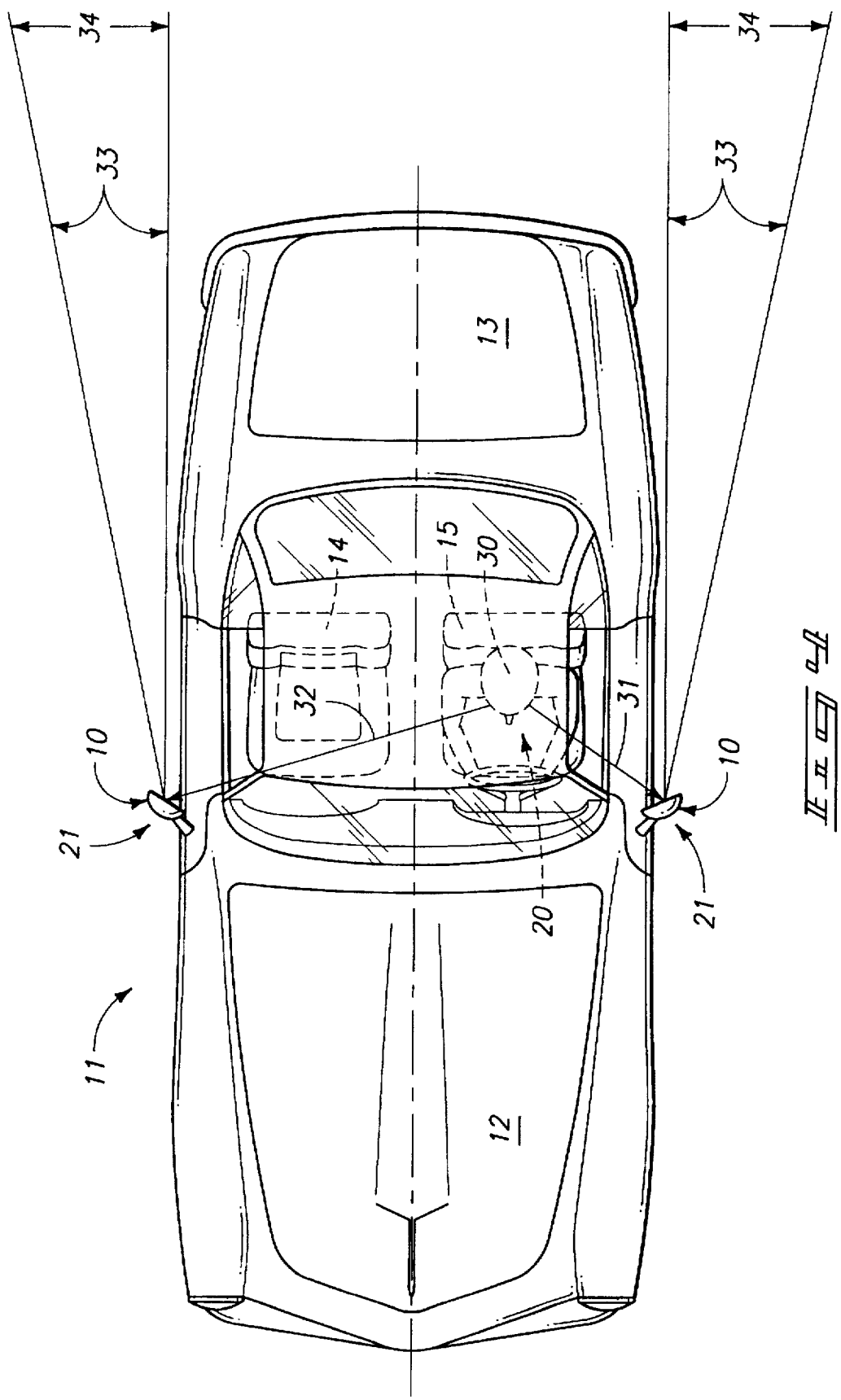

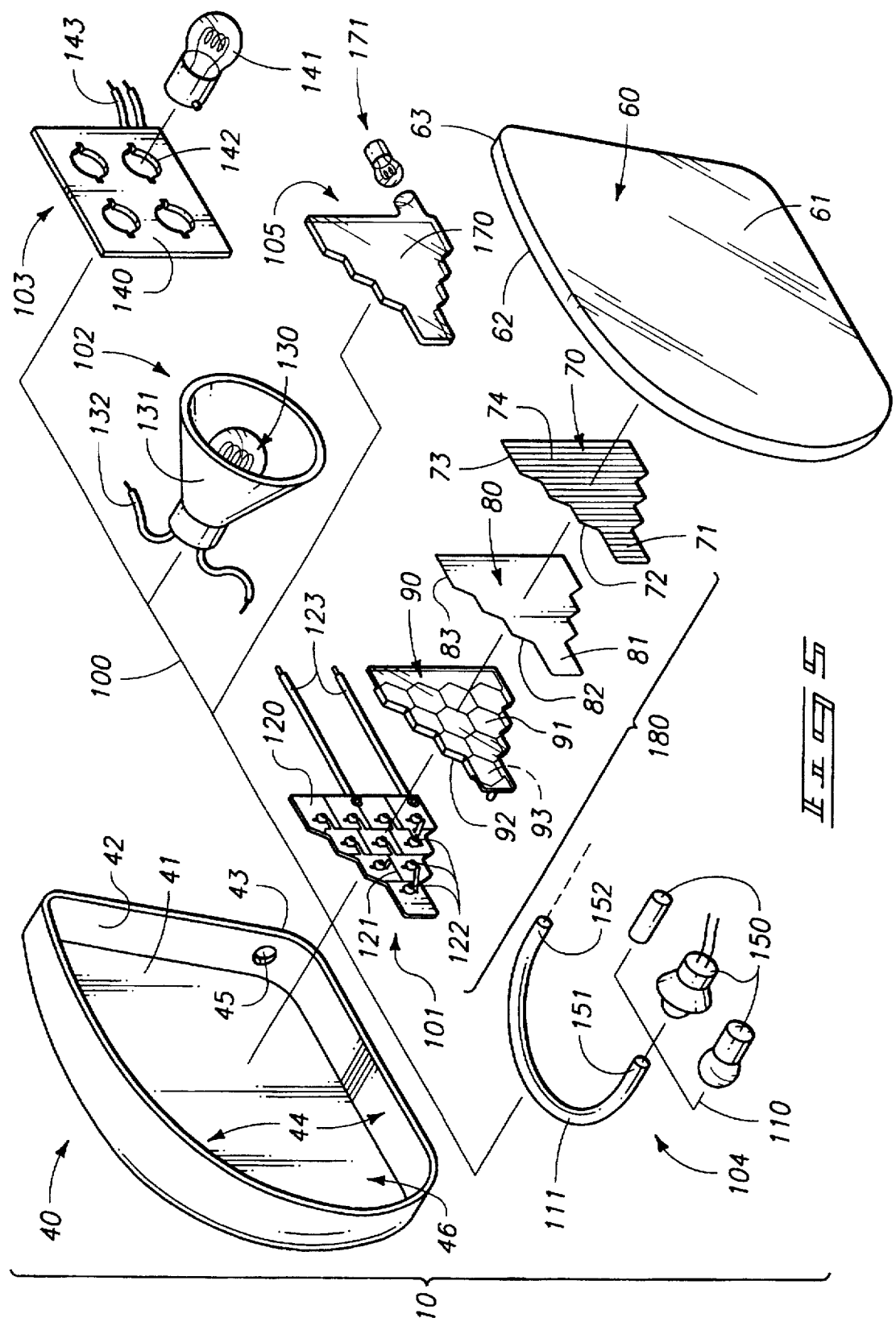

MIRROR ASSEMBLY

TECHNICAL FIELD

The present invention relates to a mirror assembly, and more specifically, to a mirror assembly which has particular utility when coupled with the controls of an overland vehicle, or the like, and which operates as a combined directional signaling lamp and rear view mirror assembly.

DESCRIPTION OF THE PRIOR ART

The beneficial effects of employing auxiliary signaling assemblies have been disclosed in various United States patents, including U.S. Pat. Nos. 5,014,167; 5,207,492; 5,355,284; 5,361,190; 5,481,409; and 5,528,422, all of which are incorporated by reference herein. The mirror assemblies disclosed in the above-captioned patents employ dichroic mirrors which are operable to reflect a broad band of electromagnetic radiation, within the visible light portion of the spectrum, while simultaneously permitting electromagnetic radiation having wavelengths which reside within a predetermined spectral band to pass therethrough. In this fashion, the dichroic mirror remains an excellent visual image reflector, that is, achieving luminous reflectance which is acceptable for automotive and other industrial applications, for example, while simultaneously achieving an average transmittance in the predetermined spectral band of at least 58%. Further, when the predetermined band pass region is relatively narrow, that is, such as 30 nanometers or more, average in-band transmittance of 80% or more can be achieved with peak transmittance in excess of 90% being common.

In U.S. Pat. No. 5,528,422, a plurality of mirror coatings were disclosed and which are operable to conceal an underlying sensor or light-emitting assembly while simultaneously providing a neutral chromatic appearance. These same mirror coatings simultaneously absorb wavelengths of electromagnetic radiation which may otherwise be transmitted into the mirror assembly and which would, over time, degrade or otherwise be harmful to the subassembly which is concealed by the mirror assembly.

While the devices disclosed in these patents have realized some degree of commercial success, certain inherent physical characteristics of the earlier disclosed mirror assemblies have impeded manufacturing efforts to cost-effectively mass produce these same assemblies. For example, while the mirror coatings disclosed in U.S. Pat. No. 5,528,422 operate as described, the manufacturing difficulties and costs associated with producing these rather complex coatings with commercially available coating fabrication equipment has impeded the introduction of low cost products for the mass market.

Other devices have attempted to diverge from the teachings provided in the patents noted above. These devices, however, when built in accordance with their teachings, have been unable to provide the same performance characteristics. An example of such prior art is the patent to Crandall, U.S. Pat. No. 5,436,741. Other prior art references describe devices which attempt to provide the sa me functional benefits, as described in the earlier patents. These references describe all manner of mirror housing modifications, where for example, lamps are located in various orientations to project light into predetermined areas both internally, and\or besides the overland vehicle, and to further provide auxiliary signaling capability. Examples of such patents include 4,646,210; 4,916,430; 5,059,015; 5,303,130; 5,371,659; 5,402,103; and 5,497,306 to name but a few.

Other prior art references have attempted to provide a combined mirror and signaling assembly. These assemblies have employed a nondichroic, semitransparent mirror with same. Perhaps the most germane patent which discloses this type of assembly is the patent to Maruyama et al U.S. Pat. No. 3,266,016. This reference is however devoid of any suggestion of how one would manufacture a device which would have an acceptable reflectivity, and an acceptable luminous output, while avoiding the detriments associated with the build up, or accumulation of heat within the mirror housing, and the associated problem of space limitations within the same mirror housing. This heat, of course, is a by-product of the lamps used with same.

In the present invention, the inventors have departed from the teachings of the prior art by providing a mirror assembly which utilizes a nondichroic, semitransparent mirror, and a light assembly which, in combination, produce a mirror assembly which has a luminous intensity which is commercially acceptable, while simultaneously maintaining an acceptable luminous reflectivity and substantially neutral chromatic appearance. The present invention, by avoiding the shortcomings of the previous prior art devices, provides a mirror assembly which can be manufactured in a cost-effective fashion not possible heretofore, and which further has improved performance characteristics.

OBJECTS AND SUMMARY OF THE INVENTION

Therefore, one aspect of the present invention is to provide an improved mirror assembly.

Another aspect of the present invention is to provide a mirror assembly which may be manufactured and installed as original equipment on an overland vehicle and the like, or which may be further manufactured in the manner of a retrofit.

Another aspect of the present invention is to provide a mirror assembly which may be readily installed or integrated with other mirror technologies such as motorized actuators, heater elements and films of various types, including diffractive, holographic, reflective and electrochromic devices of various designs.

Another aspect of the present invention is to provide a mirror assembly which includes a nondichroic, semitransparent mirror which passes about 1% to about 8% of a broad band of visible light and which reflects about 35% to about 58% of a broad band of visible light.

Another aspect of the present invention is to provide a mirror assembly which includes a light assembly positioned adjacent to a semitransparent, nondichroic mirror and which emits visible light which is passed by the semitransparent mirror, the luminous intensity of the mirror assembly being about 2 to about 20 candelas.

Another aspect of the present invention is to provide a mirror assembly which includes a light assembly positioned adjacent to a semitransparent mirror, and which has a luminous intensity of about 80 candelas to about 900 candelas.

Another aspect of the present invention is to provide a mirror assembly having an optical stack which is less than about 12 mm. in thickness, and weighs less than about 25 grams.

Still a further aspect of the present invention relates to a mirror assembly which includes a nondichroic, semitransparent mirror; a light assembly positioned adjacent to the semitransparent mirror and which has a luminous intensity of about 80 candelas to about 900 candelas; a collimating optical element positioned between the light assembly and the semitransparent mirror; a refractive optical element positioned between the collimating element and the semitransparent mirror; and a light control optical element positioned between the refractive optical element and the semitransparent mirror.

Still a further aspect of the present invention relates to a mirror assembly which has a semitransparent, nondichroic mirror, and wherein the semitransparent mirror comprises a layer of chromium having a thickness of about 200 to about 350 Angstroms.

Yet a further aspect of the present invention is to provide a mirror assembly having a nondichroic, semitransparent mirror; and a light assembly comprising about 4 to about 30 light emitting diodes, the light emitting diodes having a luminous intensity of about 80 candelas to about 900 candelas.

Another aspect of the present invention is to provide a mirror assembly which has a light assembly which has a surface area of about 6.35 to about 127 square millimeters.

Another aspect of the present invention is to provide a mirror assembly which is operable to obtain the individual benefits to be derived from related prior art assemblies and devices while avoiding the detriments individually associated therewith.

Further aspects and advantages are to provide improved elements and arrangements thereof in a mirror assembly for the purposes described and which is dependable, economical, durable and fully effective in accomplishing these intended purposes.

These and other aspects and advantages are achieved in a mirror assembly as provided for hereinafter, the mirror assembly comprising a semitransparent mirror which passes about 1% to about 8% of a broad band of visible light, and which reflects about to about 35% to about 58% of a broad band of visible light; and a light assembly positioned adjacent to the semitransparent mirror and which emits visible light which is passed by the semitransparent mirror, the luminous intensity of the mirror assembly being about 2 to about 20 candelas.

BRIEF DESCRIPTION OF THE DRAWINGS

Preferred embodiments of the invention are described below with reference to the following accompanying drawings.

FIG. 2 is a partial, perspective view of a mirror assembly of the present invention and which would be utilized on the driver's side of an overland vehicle, and which illustrates the luminous image provided by same.

FIG. 3 is a partial, perspective view of a mirror assembly of the present invention and which would be employed on the passenger side of an overland vehicle, and which illustrates the luminous image which would be provided by same.

FIG. 4 is a top, plan view of an overland vehicle of conventional design and which illustrates the approximate, projected pattern of light as provided by the mirror assembly of the present invention.

FIG. 5 is a greatly simplified, exploded, perspective view of the mirror assembly of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
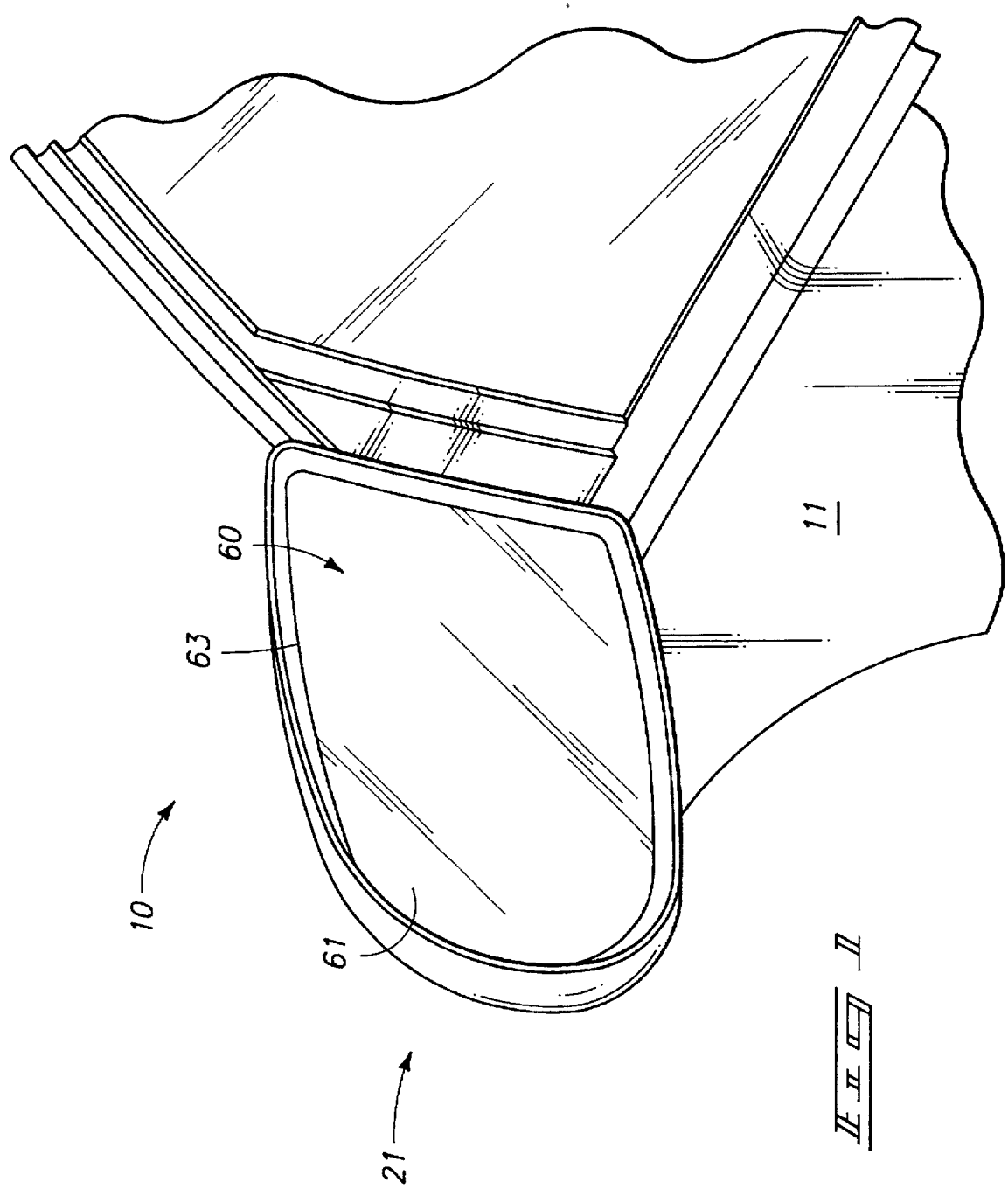
FIG. 1 is a perspective, environmental view of a mirror assembly of the present invention shown mounted on an overland vehicle of conventional design.

Referring more particularly to the drawings, the mirror assembly of the present invention is generally indicated by the numeral 10 in FIG. 1.

For illustrative convenience, the mirror assembly 10 of the present invention, and which is shown and described herein, is discussed as would be configured if it were installed on an overland vehicle 11 of conventional design. As discussed in the earlier patents, which are incorporated by reference herein, the mirror assembly 10 of the present invention may be mounted on a vehicle, alternatively, in place of the rearview mirror which is located in the passenger compartment, and/or in place of the sideview mirrors which are mounted on the exterior surface of the vehicle. The mirror assembly 10 of the subject invention will be discussed in greater detail in the paragraphs which follow.

The mirror assembly 10 is adapted to operate as a combination rearview mirror and visual signaling device, and wherein the visual signal it provides is capable of being seen from locations rearwardly of the overland vehicle 11, and which further cannot be readily seen, under most circumstances, by an operator of the same vehicle.

As best illustrated by reference to FIGS. 1 through 4, the mirror assembly 10 of the present invention is mounted on an overland vehicle 11 of conventional design. The overland vehicle has a front or forward portion 12, and a rear portion 13. The overland vehicle 11 further has a passenger compartment 14 which includes a front seat 15, and an operator's position 20. The overland vehicle 11 also includes locations 21 for a pair of exterior rearview mirrors. The overland vehicle 11 also has a hand operated directional signaling switch, and brake, not shown, and which provides a signal which may alert drivers of other vehicles in the immediate vicinity that the overland vehicle 11 is about to change directions, turn, change lanes, stop etc. Other signals may also be provided from other devices such as hazard warning switches, and all manner of other signaling devices on the automobile.

As best illustrated in FIG. 4, an operator 30, when positioned in the operator's position 20, has a field of view which extends approximately 180 degrees from the operator's position towards the forward portion 12 of the vehicle. Further, and by using a pair of mirror assemblies 10 which are located at the positions 21 on the exterior portion of the vehicle 11, the operator 30 may, by looking along predetermined lines of sight, view areas beyond his normal field of view, and rearwardly of the operator's position 20. In particular, the operator 30 has a first line of sight 31 which extends from the operator 30 to the mirror assembly 10 which is located on the driver's side of the overland vehicle 11, and which permits the operator to view rearwardly of the vehicle along the driver's side thereof. The operator 30 has a second line of sight 32 which extends from the operator 30 to the passenger side of the overland vehicle, and therefore permits the operator to view rearwardly along that side of the vehicle. Furthermore, the operator has a third line of sight which extends from the operator's position 20 to the interior rearview mirror, not shown. As best depicted in FIG. 4, the mirror assembly 10 of the present invention provides illumination zones 33 which extend rearwardly of the vehicle and substantially out of the line of sight of the operator 30.

The illumination zones have a predetermined beam spread 34 of about 2 meters when measured at a distance of about 8 meters from the mirror assembly 10. Further, the deviation angle of the driver's side illumination zone, as measured from a line perpendicular to the surface of mirror assembly is about 30%; and the deviation angle for the passenger's side illumination zone is about 25 degrees.

Referring now to FIG. 5, the mirror assembly 10 of the present invention includes a mirror housing 40 which is operable to be mounted at mirror locations 21 on the exterior portion of the overland vehicle 11. The mirror housing or enclosure has a rear wall 41 and a sidewall 42 which extends upwardly therefrom. The sidewall has a peripheral edge 43 which defines an aperture 44 having given dimensions. Further, a smaller aperture 45 is formed in the sidewall 42. The rear wall 41, and sidewall 42, define a cavity 46 which is operable to receive the mirror assembly 10 and other assemblies, such as a bezel, not shown. It should be understood that the bezel provides a means by which the accompanying mirror assembly 10 may be movably supported within the housing and then can be adjusted, either manually or remotely, as by motorized actuators, to a given angular orientation relative to the first and second lines of sight 31 and 32. This provides the means by which the operator 30 may adjust his given field of view. The bezel has not been illustrated in FIG. 5 to facilitate the understanding of the present invention.

The mirror assembly 10 of the present invention, as shown in FIG. 5, includes a semitransparent, nondichroic mirror 60 which passes about 1% to about 8% of a broad band of visible light, and which reflects about 35% to about 58% of a broad band of visible light. The semitransparent, nondichroic mirror 60 has a front or exterior facing surface 61, and an opposite, rearwardly facing 62. The semitransparent mirror 60 further has a peripheral edge 63 which substantially corresponds in shape and size to the aperture 44, and which, when assembled, substantially occludes the aperture 44. The semitransparent, nondichroic mirror 60 is formed by depositing a layer of chromium on one of the surfaces thereof, such as the front surface 61 and wherein the layer of chromium has a thickness of about 200 to about 350 Angstroms, and a preferred thickness of about 225 to about 275 Angstroms. The semitransparent mirror is fabricated from suitable transparent substrates such as automotive glass, polycarbonate or similar materials.

Figure 6:
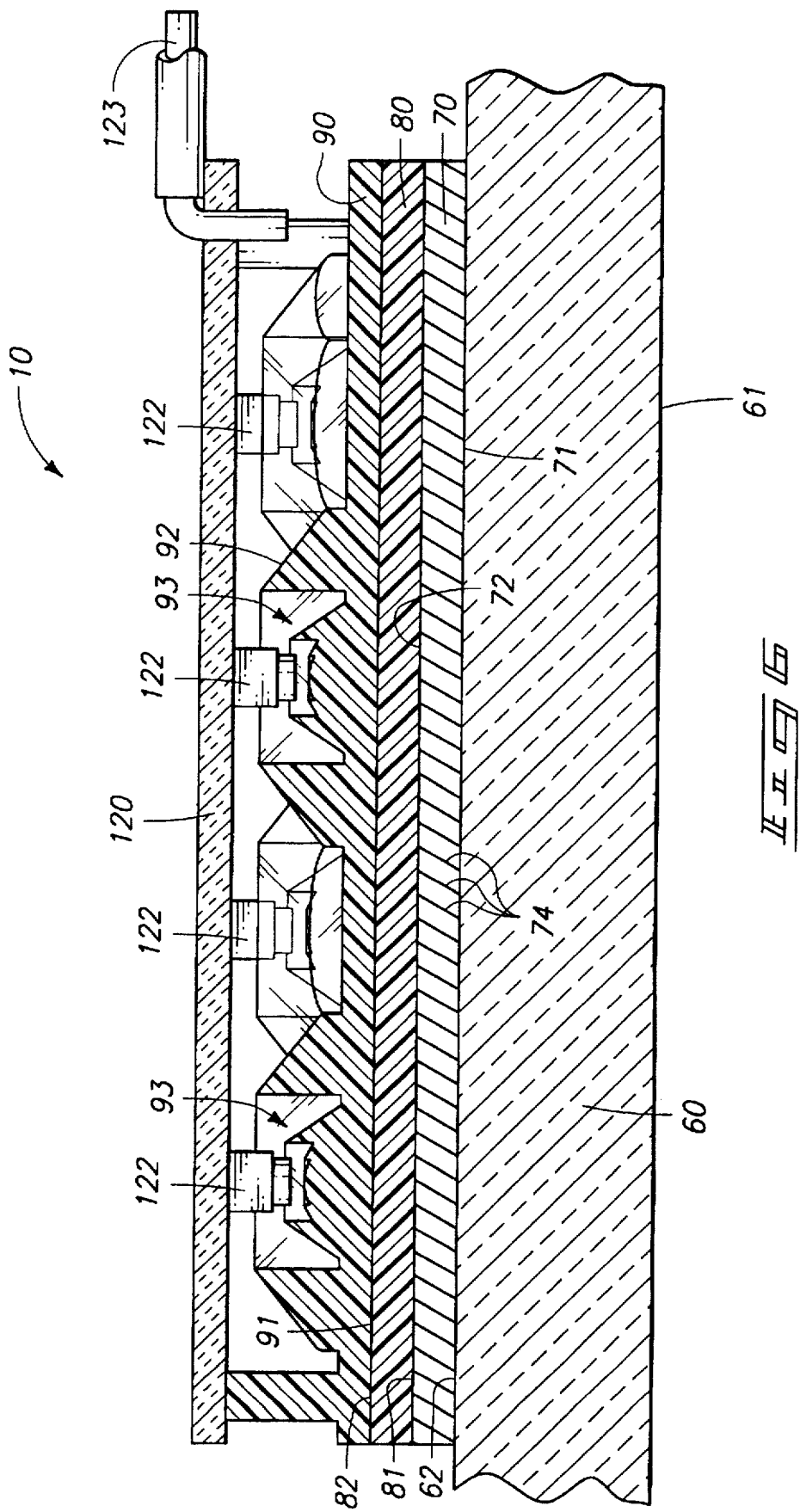
FIG. 6 is a greatly enlarged, longitudinal, vertical sectional view of the mirror assembly of the present invention.

Referring now to both FIGS. 5 and FIG. 6, the mirror assembly 10 of the present invention includes a light control optical element which is generally designated by the numeral 70. The light control optical element 70 has a front surface 71, and an opposite, rearwardly facing surface 72. Further, the light control optical element has a peripheral edge 73 which closely corresponds to the shape of the light assembly, which will be discussed in further detail hereinafter. The light control optical element is operable to direct the light being emitted by a light assembly along a given transmission path, outside of the first and second lines of sight 31 and 32 of the operator 30. In this regard, the preferred light control optical element includes a polycarbonate light control film. The light control optical element or film is manufactured by the 3M Company under the trade designation "LCF" (light control film). This light control optical element is a thin plastic film enclosing a plurality of closely spaced, black colored microlouvers 74. The light control film is approximately 0.030 inches (0.75 millimeters) thick and the microlouvers are spaced approximately 0.005 inches apart (0.127 millimeters). The microlouvers may be a transparent black or an opaque black and further, the microlouvers may be positioned in various angles to provide a viewing angle, which may include angles as narrow as 48 degrees, plus or minus 6 degrees, or as wide as 90 degrees, plus or minus 15 degrees. It should be understood that the light control optical element 70 permits light emitted by the light assembly, which will be discussed hereinafter, to escape along the illumination zones 33, but is farther operable to substantially inhibit or block the light emitted by an associated light assembly from traveling along the first and second lines of sight 31 and 32, respectively, and into the view of the operator 30. This is best seen by reference to FIG. 4. Of course, other similar assemblies could be fabricated and used with equal success.

It should be understood that in certain environments the light control optical element 70 may be completely eliminated, or may further be discontinuous, that is, only a portion of the light assembly, which will be discussed hereinafter, may be covered or otherwise effected by the light control optical element. The light control optical element 70 is secured to the rear surface 62 of the semitransparent, nondichroic mirror 60 by any suitable fastening means, including adhesives and the like. The light control optical element may also comprise other structures, such as holograms and the like, and which function in a similar fashion to direct the light emitted by a light assembly into the illumination zones 33, as was described above.

As illustrated most clearly in FIGS. 5 and 6, a refractive, or second optical element which may have a total internal reflection portion 80 is positioned immediately rearwardly of the light control optical element 70. This refractive optical element, or optical element having total internal reflective portions, is operable to bend the light emitted by the light assembly, which will be discussed hereinafter, in an amount of about 20 degrees to about 40 degrees, as measured from a line positioned normal to the front surface 61 of the semitransparent, nondichroic mirror 63. In this regard, it should be understood, that the refractive optical element, or optical element having portions which are totally internally reflective 80, provides a convenient means by which the mirror assembly 10 can be readily mounted on overland vehicles 11 which are positioned at various distances above the surface of the earth. For example, if the mirror assembly 10 was mounted on a tractor-trailer type vehicle, this particular optical element would be adapted to bend the light downwardly such that it could be observed by lower situated passenger vehicles. Conversely, if this same mirror assembly 10 was mounted on a small sports car, the second optical element 80 would be adapted to direct the light emitted by the light assembly generally upwardly such that it could be observed by an operator of a tractor-trailer or similar vehicle who is sitting somewhat higher above the surface of the earth. The refractive optical element, or optical element having portions which are totally internally reflective 80 has a forward surface 81, and an opposite, rearwardly facing surface 82. Further, this same optical element 80 has a peripheral edge 83 which is substantially similar in shape to the underlying light control optical element 70 which is adjacent thereto. The refractive optical element, and light control optical element 70 are affixed together by conventional fastening means such as adhesives or the like, or may be formed as an integral component. Commercially available refractive films may be secured from 3M Company under the trade designation "Prismatic" or "Fresnel" Films.

As seen in FIGS. 5 and 6, a collimating optical element, which is generally designated by the numeral 90, is affixed or otherwise positioned on the rear surface 82 of the refractive optical element or optical element having portions which are totally internally reflective 80. This same optical element may also be integrally combined with the aforementioned optical elements into a single optical component. The collimating optical element has a forward facing surface 91, and an opposite rearward facing surface 92. A plurality of cavities 93 are formed in the rear surface 92 and are disposed in a given pattern to receive individual light emitting diodes therein. The light emitting diodes will be discussed in further detail hereinafter. While FIG. 6 illustrates a collimating optical element 90 for use with light emitting diodes, it should be appreciated from a study of FIG. 5 that a collimating optical element may be fabricated for use with other lighting means, and which will operate with equal success. The collimating optical element 90 is operable to receive the light emitted by the light assembly and collimate it into a given direction. The collimating optical element may have portions which are refractive, reflective, or both. The collimating optical element 90 is fastened by conventional means to the rear surface 82 of the refractive optical element or optical element having total internal reflective portions 80, or is made integral therewith, as was noted, above.

As best illustrated by reference to FIGS. 5 and 6, the mirror assembly 10 of the present invention includes a light assembly 100 which is positioned adjacent to the semitransparent mirror 60, and which emits a broad band of visible light which is passed by the semitransparent mirror 60. In this regard, the light assembly 100 comprises at least one light source, but as described hereinafter, the light assembly 100, whatever form it takes, is operable to deliver a luminous intensity of about 80 candelas to about 900 candelas. In this regard, a candela is defined as a unit of luminous intensity which is equal to about 1/60 of the luminous intensity per square centimeter of a black body radiator operating at the temperature of freezing platinum. This was formally known as a candle. When the mirror assembly 10 of the present invention utilizes a light assembly 100 which emits a luminous intensity of about 80 candelas to about 900 candelas, the resulting mirror assembly has a luminous intensity of about 2 to about 20 candelas when this parameter is measured at a location near the front surface 61 of the semitransparent nondichroic mirror 60. Further, when this same parameter is measured at about 8 meters from the mirror assembly the luminous intensity is greater than or equal to about 6 candelas. As seen in the exploded view of FIG. 5, the light assembly 100 is borne by the housing 40 and positioned in the cavity 46 for purposes of emitting a broad band of visible electromagnetic radiation. In the embodiments shown, four alternative light sources are illustrated, and may be used with equal success. However, the invention is not limited to the four light sources discussed herein, but may include other artificial light sources which have the functional characteristics which are discussed above. It should be understood that notwithstanding the light assembly 100 selected, the light assembly must be operable to produce a luminous intensity of about 80 candelas to about 900 candelas such that the resulting mirror assembly 10 may have a luminous intensity of about 2 to about 20 candelas. Contrary to the prior art teachings which require that the light source selected be substantially matched, that is, emit wavelengths which are substantially identical to the peak wavelengths transmitted by an associated dichroic mirror, the present invention requires no band pass matching. Rather, the semitransparent, nondichroic mirror 60 passes substantially all visible wavelengths in equal amounts. The individual light assemblies 100 include first, second, third, fourth, and fifth forms 101, 102, 103, 104, and 105, respectively.

The first form 101 of the light assembly 100 includes a bank of light emitting diodes; the second form 102 includes a single lamp having a light bulb and reflector; the third form 103 includes a lamp support plate which is adapted to receive a plurality of automotive light bulbs 104; the fourth form of the light assembly 100 may include light sources of various types 110, and a light pipe 111 which is operable to direct the light generated by the various light sources 110 to a predetermined destination within the housing 40; and the fifth form comprises a flat panel illuminator and accompanying light source.

The particular details of these individual forms of the light assembly 100 will now be discussed in greater detail.

The first form 101 of the light assembly 100, as noted above, includes a bank of light emitting diodes (LEDs) which are individually mounted on a support plate or substrate 120. The individual light emitting diodes 122 are adapted to produce artificial light having wavelengths which fall within given spectral bands. For example, light emitting diodes may be selected which include the 600 through 700 nanometer band and which produce the perceivable color red. Alternatively LED's may also be selected which produce colors such as yellow, green and blue, depending upon the designer's preference. Still further, LED's which produce individually distinct colors may be grouped together on the support substrate, as in the nature of individual pixels, such that a range of colors may be emitted, as by color mixing, that is, by individually energizing selective light emitting diodes 122 in each of the pixel groupings. As should be understood, such light mixing was not feasible using the prior art dichroic mirrors because of the need to substantially match the wavelengths of light emitted by the light source, with the wavelengths of light which would be passed efficiently by the dichroic mirror. Consequently the present invention provides increased design flexibility and reduces the cost of manufacturing by eliminating the need to stock many different types of mirrors. In the present invention, the same mirror can be employed to transmit any colored light. As seen in FIG. 5, conductive traces 121 are provided on the supporting substrate 120, and are operable to conduct electricity to the individual light emitting diodes 122, which are provided in predetermined patterns to produce the luminous effects as illustrated in FIGS. 2 and 3. Of course many other shapes are possible including alphanumeric indicia. The electricity is provided by means of electrical leads 123 which extend through the aperture 45 formed in the housing 40. The electrical leads are coupled to the electrical system of the overland vehicle 11 and may be energized by means of various devices such as the directional signaling switch, and the brakes of the vehicle 11, to name but a few. As noted above, light assembly 100 has a luminous intensity, once energized, of about 80 candelas to about 900 candelas. Further, the light assembly has a surface area of about 6.35 to about 127 square millimeters. When energized, the light assembly emits energy which is less than about 16 watts per square millimeter of surface area (0.63 watts per square inch). Further, the luminous intensity of the assembled mirror assembly 10 is about 2 to about 20 candelas. Light emitting diodes 122 which fit these performance characteristics are manufactured by Hewlett Packard under the trade designation "Polyled". These particular LED's are high efficiency, ultra radiant red and have a narrow viewing angle and a peak wavelength which falls within about 600 to 700 nanometers. It should be understood that each of the individual light emitting diodes 122 have beam centers which are individually oriented in substantially the same direction and are received in the cavities 93 formed in the collimating optical element 90. This is best seen by reference to FIG. 6.

Referring now to FIG. 5, with respect to the second form 102 of the light assembly 100, the second form includes a single bulb or lamp 130 which is mounted in, or made integral with a suitable reflector 131. This lamp would emit the same wavelengths of light as discussed with the first form, above. The lamp 130 would be connected by suitable electrical leads 132 to the signalling assemblies of the overland vehicle 11, such as for example, the braking system and directional signaling system and whereupon applying pressure to the brake pedal or the actuation of the signaling directional switch, the lamp would become energized. An appropriate commercial lamp for this purpose is the GE Precise Lamp and which is designated commercially as the MR-16.

As best illustrated by reference to FIG. 5, the third form 103 of the light assembly 100 includes a synthetic support plate 140 which supports a plurality of replaceable automotive bulbs 141, such as the model number 882 automotive bulb, which are commercially available nationwide. These lamps similarly would emit the same wavelengths of light as discussed with the first form above. As best seen by reference to the drawings, the lamp support plate 140 has a plurality of apertures 142 which permits the individual replaceable lamps to be electrically coupled to the lamp support plate. The lamp support plate, of course, carries suitable etching on the reverse surface (not shown) and which conducts electrical current from appropriate electrical leads 143 to the individual lamps.

The fourth form 104 of the light assembly 100 includes a light engine having a high intensity discharge lamp; or incandescent; or halogen; or light emitting diode; or laser; or fluorescent; or neon; or other luminous emitter 150 which are individually placed in a predetermined remote location on the overland vehicle 11 relative to the mirror housing 40. As seen in FIG. 5, located in light receiving relation relative to the individual light sources 110 is the receiving end 151 of the optical cable or light pipe 111. The fourth form of the light assembly 104 also includes a secondary optical assembly (not shown) and which may be necessary to gather the light from the light source 105 and input or focus it into the receiving end 151. These secondary assemblies, which are not shown, are well understood in the art. The light pipe has a remote or discharge end 152 which extends through the aperture 45 and is positioned at a predetermined location internally of the cavity 46. The discharge end is secured within the housing 40 in a predetermined location such that light transmitted by the light pipe emanates into the housing and interacts, as appropriate, with the optical assemblies therein. Secondary optical assemblies which may be included in the housing 40 in addition to those shown herewith may include assemblies such as fresnel lenses, total internal reflectors, holograms, diffusers, etc. The fifth form of the light assembly comprises a flat panel illuminator 170 and suitable lamp 171 which is disposed in light emitting relation thereto.

As should be understood, the first form of the light assembly 120 and optical elements 70, 80, and 90 are normally enclosed within a sealed housing, not shown, such that they are protected from the ambient environment. Further, the optical elements 70, 80, and 90, and the first form of light assembly 120 comprise an optical stack 180 which has a given thickness of less than about 12 mm., and a weight of less than about 25 grams. This thickness dimension and weight characteristic allows the present invention to be readily installed on existing exterior mirror designs usually without any or on occasion only slight design modifications to the mirror housings and bezel designs employed with same. Further, these same thickness and weight characteristics do not detract from the performance parameters of these same mirrors. For example, the weight characteristic does not cause the existing mirror designs to operate in an unsatisfactory fashion such as when they are subjected to normal vibratory motion, or jarring, which could tend to cause the associated mirror to become periodically displaced, or misaligned and require subsequent operator adjustment. As should be appreciated, the weight of the optical stack 180, if great enough, could potentially cause the underlying mirror to become unbalanced to a point where severe vibratory motion of a given magnitude may cause the mirror to become displaced when exposed to same.

OPERATION

The operation of the described embodiment of the present invention is believed to be readily apparent and is briefly summarized at this point.

As best illustrated by references to FIGS. 4 and 5, the invention includes a semitransparent mirror 60 which passes about 1% to about 8% of a broad band of visible light and which reflects about 35% to about 58% of a broad band of visible light; and a light assembly 100 positioned adjacent to the semitransparent mirror 60 and which emits visible light which is passed by the semitransparent mirror, the luminous intensity of the mirror assembly 10 being about 2 to about 20 candelas.

As discussed earlier, the mirror assembly 10 has a semitransparent mirror 60 which has front and rear surfaces 61 and 62 respectively, and a layer of chromium having a thickness of about 200 to about 350 Angstroms is applied to the front surface thereof. As best seen by reference to FIG. 5, the mirror assembly 10 comprises a housing or enclosure 40 which defines an aperture 44, and wherein the light assembly 100 is positioned in the enclosure. In addition, the mirror assembly 10 includes a collimating optical element 90 which is positioned between the light assembly 100 and the semitransparent mirror 60; and a refractive optical element or an optical element having total internal reflective portions 80 is positioned between the collimating optical element 90 and the rear surface 62 of the semitransparent, nondichroic mirror 60. The mirror assembly 10 may further comprise a light control optical element 70 which is positioned between the refractive optical element, or optical element having total internal reflective portions 80 and the semitransparent, nondichroic mirror 60. As seen in FIG. 4, the light control optical element 70 is operable to direct light emitted by the light assembly 100 along given paths of travel and into the illumination zones 33. As will be appreciated, the illumination zones are normally outside the line of sight of the operator 30, thereby providing a convenient means by which an adjacent automobile or observer may be provided with signals regarding the operation of the overland vehicle 11.

The mirror assembly 10, as noted above, has a light assembly 100 which comprises at least one light source, but most preferably, comprises about 4 to about 30 light emitting diodes. In this regard, the luminous intensity of the light assembly 100 is about 80 candelas to about 900 candelas. When energized, the light assembly 100 is operable to emit sufficient luminous intensity such that the mirror assembly 10 has a luminous intensity of about 2 to about 20 candelas. In view of the light output as provided by the individual light emitting diodes, and further in view of the collimating effect of the collimating optical element, sufficient light passes through the semitransparent, nondichroic mirror such that a highly functional and visibly discernible signal is provided. Further, in view of the smaller number of higher intensity light emitting diodes employed, adverse heat build-up within the enclosure 40 is avoided, and space within the enclosure is preserved for other assemblies such as motorized actuators, bezels, and other assemblies which are normally mounted within such enclosures. The present invention is operable to produce not greater than about 16 watts of energy per square millimeter of the surface area of the light assembly 100

Therefore, the mirror assembly 10 of the present invention comprises: a substantially neutrally reflective nondichroic, semitransparent mirror 60 having front and rear surfaces 61 and 62 respectively, and which passes about 1% to about 8% of a broad band of visible light, and wherein the front surface 61 reflects about 35% to about 58% of a broad band of visible light; a light assembly 100 positioned adjacent to the rear surface of the semitransparent mirror 60 and which emits visible light which is passed by the semitransparent mirror, the light assembly having a luminous intensity of about 80 candelas to about 900 candelas, and the luminous intensity of the mirror assembly 10 being about 2 to about 20 candelas, and wherein the light assembly has a surface area of about 6.35 to about 127 square mm; a collimating optical element 90 positioned between the light assembly 100 and the rear surface 62 of the semitransparent mirror 60; a refractive optical element, or optical element having total internal reflective portions 80 positioned between the collimating optical element 90, and the rear surface 62 of the semitransparent, nondichroic mirror 60; and a light control optical element 70 positioned between the refractive optical element, or optical element having total internal reflective portions and the rear surface 62 of the semitransparent, nondichroic mirror 60, and wherein the collimating, refractive, and light and control optical elements, and the light assembly comprise an optical stack having a thickness of less than about 12 mm, and a weight of less than about 25 grams.

The present invention achieves benefits not provided for in the prior art. In particular, the present invention avoids the shortcomings and costs associated with the prior art practices of employing a dichroic mirror. The present invention thus provides design flexibility, and decreased manufacturing costs not possible heretofore in a mirror assembly which is highly efficient, compact, lightweight and cost effective to manufacture. The present mirror assembly 10 is highly reliable in operation and provides superior signaling capability for overland vehicles for various designs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Having described my invention what we claim is new and desire to secure by Letters Patent is:

1. A mirror assembly comprising:
   a semitransparent nondichroic mirror which passes 8% or less of substantially all visible light, and which reflects about 35% to about 58% of a broad band of visible light; and
   a light assembly which emits visible light which is passed by the semitransparent mirror, the luminous intensity of the mirror assembly being about 2 to about 20 candelas.

2. A mirror assembly as claimed in claim 1, wherein the semitransparent mirror has front and rear surfaces, and a layer of chromium is formed on one of the surfaces.

3. A mirror assembly as claimed in claim 1, wherein the semitransparent mirror has front and rear surfaces, and a layer of chromium is formed on one of the surfaces, and wherein the layer of chromium has a thickness of about 200 to about 350 Angstroms.

4. A mirror assembly as claimed in claim 1, and further comprising an enclosure defining an aperture, and wherein the semitransparent mirror substantially occludes the aperture, and wherein the light assembly is positioned in the enclosure.

5. A mirror assembly as claimed in claim 1, and further comprising a collimating optical element which is positioned between the light assembly and the semitransparent mirror.

6. A mirror assembly as claimed in claim 1, and further comprising a refractive optical element which is positioned between the light assembly and the semitransparent mirror.

7. A mirror assembly as claimed in claim 1, and further comprising an optical element having a total internal reflection portion positioned between the light assembly and the semitransparent mirror.

8. A mirror assembly as claimed in claim 1, and further comprising an optical element which has refractive and total internal reflection portions.

9. A mirror assembly as claimed in claim 1, and further comprising a light control optical element which is positioned between the light assembly and the semitransparent mirror.

10. A mirror assembly as claimed in claim 1, wherein the light assembly comprises at least one light source.

11. A mirror assembly as claimed in claim 1, wherein the light assembly comprises about 4 to about 30 light emitting diodes.

12. A mirror assembly as claimed in claim 1, wherein the light assembly has a luminous intensity of about 80 candelas to about 900 candelas.

13. A mirror assembly as claimed in claim 1, and further comprising:
    a first collimating optical element positioned between the light assembly and the semitransparent mirror; and
    a second optical element which is positioned between the first collimating optical element, and the semitransparent mirror.

14. A mirror assembly as claimed in claim 13, wherein the second optical element is refractive.

15. A mirror assembly as claimed in claim 13, wherein the second optical element has a total internal reflection portion.

16. A mirror assembly as claimed in claim 13, wherein the second optical element includes portions which are refractive or totally internally reflective.

17. A mirror assembly as claimed in claim 13, wherein the first and second optical elements and the light assembly comprise an optical stack which has a thickness dimension of less than about 12 mm.

18. A mirror assembly as claimed in claim 13, wherein the first and second optical elements and the light assembly comprise an optical stack having a thickness dimension of less than about 12 mm, and a weight of less than about 25 grams.

19. A mirror assembly as claimed in claim 13, wherein the first and second optical elements and the light assembly comprise an optical stack having a thickness dimension of less than about 12 mm., and wherein the light assembly has a surface area of about 6.35 to about 127 mm.

20. A mirror assembly as claimed in claim 13, wherein the first and second optical elements and the light assembly comprise an optical stack having a thickness dimension of less than about 12 mm., and wherein the light assembly has a surface area of about 6.35 to about 127 mm., and wherein the light assembly when energized emits heat energy in an amount of less than about 16 watts per square millimeter of surface area.

21. A mirror assembly as claimed in claim 1, wherein the light assembly has a surface area of about 6.35 to about 127 square millimeters.

22. A mirror assembly as claimed in claim 1, wherein the light assembly has a luminous intensity of about 80 to about 900 candelas, and a surface area of about 6.35 to about 127 square millimeters, and wherein the light assembly, when energized, emits not more than about 16 watts of energy per square millimeter of surface area.

23. A mirror assembly as claimed in claim 1, wherein the light assembly, when energized, emits sufficient light to provide a luminous intensity of about 6 candelas when measured at a distance of about 8 meters from the semitransparent mirror.

24. A mirror assembly as claimed in claim 1, wherein the light assembly, when energized, emits sufficient light to provide a luminous intensity of about 6 candelas, and a beam spread of about 2 meters when measured at a distance of about 8 meters from the semitransparent mirror.

25. A mirror assembly as claimed in claim 1, and further comprising:
   a collimating optical element positioned between the light assembly and the semitransparent mirror;
   a refractive optical element positioned between the collimating optical element, and the rear surface of the semitransparent mirror; and
   a light control optical element positioned between the refractive optical element and the rear surface of the semitransparent mirror.

26. A mirror assembly as claimed in claim 1, and further comprising a refractive optical element positioned between the light assembly and the semitransparent mirror, and wherein the light assembly comprises about 4 to about 30 lamps, and wherein the refractive optical element bends the light emitted by the individual lamps in an amount of about 20 degrees to about 40 degrees as measured from a line normal to the semitransparent mirror.

27. A mirror assembly as claimed in claim 1, and further comprising a collimating optical element positioned between the light assembly and the semitransparent mirror, and wherein the light assembly comprises about 4 to about 30 lamps, each of the lamps having a beam axis, and wherein the collimating optical element has a plurality of lens portions which are individually disposed in substantially coaxial alignment with the beam axis of one of the lamps.

28. A mirror assembly comprising:
   a substantially neutrally reflective, nondichroic, semitransparent mirror having front and rear surfaces, and which passes 8% or less of substantially all of visible light, and wherein the front surface reflects about 35% to about 58% of a broad band of visible light; and
   a light assembly which emits visible light which is passed by the semitransparent mirror, the light assembly having a luminous intensity of about 80 candelas to about 900 candelas, and the luminous intensity of the mirror assembly being about 2 to about 20 candelas.

29. A mirror assembly as claimed in claim 28, wherein the semitransparent mirror further comprises a layer of chromium formed on one of the surfaces of the semitransparent mirror.

30. A mirror assembly as claimed in claim 28, wherein the semitransparent mirror further comprises a layer of chromium formed on one of the surface of the semitransparent mirror, and wherein the layer of chromium has a thickness of about 200 to about 350 Angstroms.

31. A mirror assembly as claimed in claim 28, and further comprising an enclosure defining an aperture, and wherein the semitransparent mirror substantially occludes the aperture, and wherein the light assembly is positioned in the enclosure.

32. A mirror assembly as claimed in claim 28, and further comprising a collimating optical element which is positioned between the light assembly and the rear surface of the semitransparent mirror.

33. A mirror assembly as claimed in claim 28, and further comprising a refractive or totally internally reflective optical element which is positioned between the light assembly and the rear surface of the semitransparent mirror.

34. A mirror assembly as claimed in claim 28, and further comprising a light control optical element which is positioned between the light assembly and the rear surface of the semitransparent mirror.

35. A mirror assembly as claimed in claim 28, wherein the light assembly comprises at least one light source.

36. A mirror assembly as claimed in claim 28, wherein the light assembly comprises about 4 to about 30 light emitting diodes.

37. A mirror assembly as claimed in claim 28, and further comprising:
   a collimating optical element positioned between the light assembly and the rear surface of semitransparent mirror; and
   a refractive or totally internally reflective optical element positioned between the collimating optical element, and the rear surface of the semitransparent mirror.

38. A mirror assembly as claimed in claim 28, and further comprising:
   a collimating optical element positioned between the light assembly and the rear surface of semitransparent mirror;
   a refractive or totally internally reflective optical element positioned between the collimating optical element, and the rear surface of the semitransparent mirror; and
   a light control optical element positioned between the refractive or totally internally reflective optical element and the rear surface of the semitransparent mirror.

39. A mirror assembly as claimed in claim 38, wherein the collimating, refractive, and light control optical elements and the light assembly comprise an optical stack which has a thickness dimension of less than about 12 mm.

40. A mirror assembly as claimed in claim 38, wherein the collimating, refractive, and light control optical elements and the light assembly comprise an optical stack having a thickness dimension of less than about 12 mm, and a weight of less than about 25 grams.

41. A mirror assembly as claimed in claim 38, wherein the collimating, refractive, and light control optical elements and the light assembly comprise an optical stack having a thickness dimension of less than about 12 mm., and wherein the light assembly has a surface area of about 6.35 to about 127 mm.

42. A mirror assembly as claimed in claim 38, wherein the collimating, refractive, and light control optical elements and the light assembly comprise an optical stack having a thickness dimension of less than about 12 mm., and wherein the light assembly has a surface area of about 6.35 to about 127 mm., and wherein the light assembly, when energized, emits energy in an amount of less than about 16 watts per square millimeter of surface area.

43. A mirror assembly as claimed in claim 28, wherein the light assembly has a surface area of about 6.35 to about 127 square millimeters.

44. A mirror assembly as claimed in claim 28, wherein the light assembly, when energized, emits sufficient light to provide a luminous intensity of about 6 candelas when measured at a distance of about 8 meters from the semitransparent mirror.

45. A mirror assembly as claimed in claim 28, wherein the light assembly, when energized, emits sufficient light to provide a luminous intensity of about 6 candelas, and further has a beam spread of about 2 meters when measured at a distance of about 8 meters from the semitransparent mirror.

46. A mirror assembly as claimed in claim 28, and further comprising a refractive optical element positioned between the light assembly and the rear surface of the semitransparent mirror, and wherein the light assembly comprises about 4 to about 30 lamps, and wherein the refractive optical element bends the light emitted by the individual lamps in an amount of about 20 degrees to about 40 degrees as measured from a line which extends normal to the front surface of the semitransparent mirror.

47. A mirror assembly as claimed in claim 28, and further comprising a collimating optical element positioned between the light assembly and the rear surface of the semitransparent mirror, and wherein the light assembly comprises about 4 to about 30 lamps, and wherein the collimating optical element has a plurality of lens portions which are individually disposed in substantially coaxial alignment with the beam axis of one of the lamps.

48. A mirror assembly as claimed in claim 28, and wherein the light assembly has a weight of less than about 25 grams.

49. A mirror assembly comprising:

a semitransparent substantially nondichroic mirror having front and rear surfaces, and which passes 8% or less of substantially all visible light, and wherein the front surface reflects about 35% to about 58% of a broad band of visible light;

a light assembly which emits visible light which is passed by the semitransparent mirror, the luminous intensity of the mirror assembly being about 2 to about 20 candelas; and a collimating optical element positioned between the light assembly and the rear surface of the semitransparent mirror.

50. A mirror assembly comprising:

a substantially neutrally reflective, nondichroic, semitransparent mirror having front and rear surfaces, and which passes 8% or less of substantially all visible light, and wherein the front surface reflects about 35% to about 58% of a broad band of visible light;

a light assembly which emits visible light which is passed by the semitransparent mirror, the light assembly having a luminous intensity of about 80 candelas to about 900 candelas, and the luminous intensity of the mirror assembly being about 2 to about 20 candelas; and a collimating optical element positioned between the light assembly and the rear surface of the semitransparent mirror.

51. A mirror assembly comprising:

a substantially neutrally reflective, nondichroic, semitransparent mirror having front and rear surfaces and which passes 8% or less of substantially all visible light, and wherein the front surface reflects about 35% to about 58% of a broad band of visible light;

a light assembly which emits visible light which is passed by the semitransparent mirror, the light assembly having a luminous intensity of about 80 candelas to about 900 candelas, and the luminous intensity of the mirror assembly being about 2 to about 20 candelas;

a collimating optical element positioned between the light assembly and the rear surface of the semitransparent mirror; and a refractive optical element positioned between the collimating optical element and the rear surface of the semitransparent mirror.

52. A mirror assembly as claimed in claim 51, wherein the collimating and refractive optical elements, and the light assembly comprise an optical stack having a thickness of less than about 12 mm.

53. A mirror assembly as claimed in claim 51, wherein the collimating and refractive optical elements, and the light assembly comprise an optical stack having a weight of less than about 25 grams.

54. A mirror assembly as claimed in claim 51, wherein the light assembly has a surface area of about 6.35 to about 127 square millimeters, and wherein the light assembly when energized emits energy in the amount of less than about 16 watts per square millimeter of surface area.

55. A mirror assembly comprising:

a substantially neutrally reflective, nondichroic, semitransparent mirror having front and rear surfaces and which passes 8% or less of substantially all visible light, and wherein the front surface reflects about 35% to about 58% of a broad band of visible light;

a light assembly which emits visible light which is passed by the semitransparent mirror, the light assembly having a luminous intensity of about 80 candelas to about 900 candelas, and the luminous intensity of the mirror assembly being about 2 to about 20 candelas;

a collimating optical element positioned between the light assembly and the rear surface of the semitransparent mirror; and an optical element having a total internal reflective portion positioned between the collimating optical element and the rear surface of the semitransparent mirror.

56. A mirror assembly comprising:

a substantially neutrally reflective, nondichroic, semitransparent mirror having front and rear surfaces and which passes 8% or less of substantially all visible light, and wherein the front surface reflects about 35% to about 48% of a broad band of visible light;

a light assembly which emits visible light which is passed by the semitransparent mirror, the light assembly having a luminous intensity of about 80 candelas to about 900 candelas, and the luminous intensity of the mirror assembly being about 2 to about 20 candelas;

a collimating optical element positioned between the light assembly and the rear surface of the semitransparent mirror;

a refractive or totally internally reflective optical element positioned between the collimating optical assembly and the rear surface of the semitransparent mirror; and a light control optical element positioned between the refractive optical element and the rear surface of the semitransparent mirror, and wherein the light assembly, collimating optical element, refractive or totally internally reflective optical element, and light control optical element comprise an optical stack having a thickness dimension of less than about 12 mm, and a weight of less than about 25 grams.

57. A mirror assembly comprising:

a substantially neutrally reflective, nondichroic, semitransparent mirror having front and rear surfaces and which passes 8% or less of substantially all visible light, and wherein the front surface reflects about 35% to about 58% of a broad band of visible light;

about 4 to about 30 light emitting diodes positioned adjacent to the rear surface of the semitransparent mirror and which emit visible light which is passed by the semitransparent mirror, the light emitting diodes having a collective luminous intensity of about 80 candelas to about 900 candelas, and the luminous intensity of the mirror assembly being about 2 to about 20 candelas, and wherein the light emitting diodes are located within a surface area of about 6.35 to about 127 square millimeters, and wherein the light emitting diodes when energized emit energy in the amount of less than about 16 watts per square millimeter of surface area;

a collimating optical element positioned between the light emitting diodes and the rear surface of the semitransparent mirror; and a refractive optical element positioned between the collimating optical element and the rear surface of the semitransparent mirror, the refractive optical element bending the light emitted by the individual light emitting diodes in an amount about 20 to about 40 degrees from a line which is normal to the front surface of the semitransparent mirror, and wherein the light emitting diodes, collimating optical element, and the refractive optical element comprise an optical stack which has a thickness of less than about 12 mm, and a weight of less than about 25 grams.

* * * * *

UNITED STATES PATENT AND TRADEMARK OFFICE
CERTIFICATE OF CORRECTION

PATENT NO. : 5,788,357
DATED : August 4, 1998
INVENTOR(S) : Michael D. Muth and Keith R. Spencer It is certified that error appears in the above-identified patent and that said Letters Patent is hereby corrected as shown below:

Col. 1, line 58, delete the letters "sa me", and insert the word --same--.

In column 6, line 8, delete the word "farther" and insert the word --further--.

Signed and Sealed this

Twenty-ninth Day of December, 1998

Attest:

BRUCE LEHMAN

Attesting Officer

*Commissioner of Patents and Trademarks*